US009628831B2

(12) United States Patent
Koum et al.

(10) Patent No.: US 9,628,831 B2
(45) Date of Patent: Apr. 18, 2017

(54) MULTIMEDIA TRANSCODING METHOD AND SYSTEM FOR MOBILE DEVICES

(75) Inventors: Jan Koum, Santa Clara, CA (US); Brian Acton, Santa Clara, CA (US)

(73) Assignee: WhatsApp, Inc., Mountain View, CA (US)

( * ) Notice: Subject to any disclaimer, the term of this patent is extended or adjusted under 35 U.S.C. 154(b) by 321 days.

(21) Appl. No.: 13/559,558

(22) Filed: Jul. 26, 2012

(65) Prior Publication Data
US 2012/0294352 A1 Nov. 22, 2012

Related U.S. Application Data

(63) Continuation-in-part of application No. 12/732,182, filed on Mar. 25, 2010.

(51) Int. Cl.
| | |
|---|---|
| H04W 4/18 | (2009.01) |
| H04N 21/2343 | (2011.01) |
| H04N 21/258 | (2011.01) |
| H04N 21/414 | (2011.01) |
| H04N 21/4788 | (2011.01) |

(52) U.S. Cl.
CPC ........... *H04N 21/234309* (2013.01); *H04N 21/25833* (2013.01); *H04N 21/25858* (2013.01); *H04N 21/41407* (2013.01); *H04N 21/4788* (2013.01)

(58) Field of Classification Search
CPC .................. H04L 51/06; H04L 67/2823
See application file for complete search history.

(56) References Cited

U.S. PATENT DOCUMENTS

| | | | |
|---|---|---|---|
| 6,295,458 B1 | 9/2001 | Takahashi | |
| 6,714,799 B1 | 3/2004 | Park et al. | |
| 7,177,872 B2 * | 2/2007 | Schwesig | ............. G11B 27/031 |
| 7,260,207 B2 | 8/2007 | Marsico | |
| 7,496,349 B1 | 2/2009 | Gailloux et al. | |

(Continued)

OTHER PUBLICATIONS

United States Office Action for U.S. Appl. No. 12/732,202, filed Dec. 18, 2014, 30 pages.

(Continued)

*Primary Examiner* — Vladimir Magloire
*Assistant Examiner* — Frank Donado
(74) *Attorney, Agent, or Firm* — Fenwick & West LLP

(57) ABSTRACT

Aspects of the present invention include method and systems or processing multimedia data exchanged between mobile devices. Initially, a transmitting mobile device attempts to send multimedia data formatted in a primary format even though a receiving mobile device cannot process the data. The multimedia data in the primary format is then uploaded to a multimedia communication server where the multimedia data can be transcoded on demand into a secondary format that the receiving mobile device can indeed process. To track the multimedia data, the transmitting mobile device receives a multimedia identifier associated with the multimedia data uploaded to the multimedia communication server. Instead of sending the multimedia data, the transmitting mobile device forwards the multimedia identifier to the receiving mobile device allowing the receiving mobile device to demand transcoding the multimedia data into a secondary format on the server that the receiving mobile device is capable of receiving and processing.

32 Claims, 8 Drawing Sheets

(56) References Cited

U.S. PATENT DOCUMENTS

| | | | |
|---|---|---|---|
| 7,502,339 B1 | 3/2009 | Pirkola et al. | |
| 7,738,833 B2 * | 6/2010 | Bettis | H04L 12/583 370/493 |
| 7,889,849 B2 | 2/2011 | Chatterjee et al. | |
| 8,169,409 B2 | 5/2012 | Castagnet | |
| 8,249,572 B2 * | 8/2012 | Shanahan | 455/418 |
| 8,412,240 B2 | 4/2013 | Bhatt et al. | |
| 2003/0109272 A1 | 6/2003 | Mousseau et al. | |
| 2004/0156495 A1 | 8/2004 | Chava et al. | |
| 2005/0064852 A1 * | 3/2005 | Baldursson | G06F 17/3089 455/414.2 |
| 2005/0108550 A1 | 5/2005 | Stelzl | |
| 2006/0165060 A1 | 7/2006 | Dua | |
| 2006/0262917 A1 | 11/2006 | Marsico | |
| 2007/0233859 A1 | 10/2007 | Zhao et al. | |
| 2007/0238472 A1 | 10/2007 | Wanless | |
| 2007/0249375 A1 | 10/2007 | Zapata | |
| 2007/0281668 A1 | 12/2007 | Fleming | |
| 2008/0020707 A1 | 1/2008 | Takayama et al. | |
| 2008/0020738 A1 | 1/2008 | Ho et al. | |
| 2008/0167083 A1 | 7/2008 | Wyld et al. | |
| 2008/0182548 A1 | 7/2008 | Pattison et al. | |
| 2008/0209213 A1 | 8/2008 | Astrand et al. | |
| 2008/0248815 A1 * | 10/2008 | Busch | H04W 4/02 455/456.5 |
| 2008/0292092 A1 | 11/2008 | LaPorte et al. | |
| 2009/0006613 A1 | 1/2009 | Toutain et al. | |
| 2009/0131022 A1 | 5/2009 | Buckley et al. | |
| 2009/0147778 A1 | 6/2009 | Wanless et al. | |
| 2009/0221310 A1 | 9/2009 | Chen et al. | |
| 2009/0234927 A1 | 9/2009 | Buzescu | |
| 2009/0288114 A1 | 11/2009 | Masuda | |
| 2010/0004014 A1 * | 1/2010 | Coulombe | H04W 88/181 455/519 |
| 2010/0094976 A1 * | 4/2010 | Kanefsky | H04M 1/72561 709/219 |
| 2010/0105358 A1 | 4/2010 | Imashimizu et al. | |
| 2010/0135477 A1 | 6/2010 | Chen | |
| 2010/0151891 A1 | 6/2010 | Coelho | |
| 2010/0190478 A1 * | 7/2010 | Brewer | H04W 4/10 455/414.1 |
| 2010/0281169 A1 | 11/2010 | Charles | |
| 2010/0331021 A1 | 12/2010 | Bushnell | |
| 2011/0070890 A1 | 3/2011 | Wu | |
| 2011/0072086 A1 * | 3/2011 | Newsome | G06F 17/30905 709/204 |
| 2011/0072099 A1 | 3/2011 | Harju et al. | |
| 2011/0106910 A1 * | 5/2011 | Grasset | G11B 27/034 709/217 |
| 2011/0264747 A1 | 10/2011 | Mutikainen et al. | |

OTHER PUBLICATIONS

Office Action for U.S. Appl. No. 14/531,905, Oct. 5, 2015, 22 pages.

* cited by examiner

MULTIMEDIA TRANSCODING METHOD AND SYSTEM FOR MOBILE DEVICES

CROSS REFERENCE TO RELATED APPLICATIONS

This application relates to and claims benefit of U.S. patent application Ser. No. 12/732,182, filed Mar. 25, 2010 and titled "Synthetic Communication Network Method and System" by Jan Koum and Brian Acton, incorporated by reference herein for all purposes.

BACKGROUND

Technical Field

Aspects of the present invention relate to processing multimedia data for use on mobile devices and more particularly to methods, systems, and computer program products that seamlessly transcode between different types of multimedia data as used on various mobile device platforms.

Description of the Related Art

Mobile devices with multimedia data capabilities have created an explosion in the creation and playback of sound, images and video. High-resolution cameras and sound recorders on these mobile devices have enabled people to capture high quality images and videos of personal events, news events and other events as they occur. For example, mobile phones are often used to take videos and pictures as they are compact and with a person wherever they may go. Because storage capacity on these mobile devices is also plentiful, there is a no limit to the amount of multimedia data people can create and store.

Sharing multimedia data with others is also rapidly growing in popularity as mobile devices incorporate increasingly high-speed data connections and powerful processors. With sophisticated editing software on the mobile device, users can quickly compile a variety of multimedia data into presentations suitable for friends or business. And almost instantly, the user may send their multimedia presentations directly to other mobile phones thereby promoting further sharing and the exchange of multimedia data on mobile devices. Indeed, users are sharing more multimedia data directly using their mobile devices as it is no longer necessary to download data from mobile devices onto a computer and then share via email or photo sharing sites.

Despite these advances, a great deal of multimedia data remains incompatible between different mobile device platforms due to incompatible formats or other variations. In the case of smartphones and other mobile phone devices, the multimedia data formats supported on each device are often limited by the phone manufacturers specifications and design choices. Consequently, if a mobile phone device receives a video, images, audio or other multimedia data in an unsupported format, the device will not be able to decode and play it back to the user. In some cases, the mobile phone device may not even allow storing data in an unsupported data format as the multimedia data may be flagged as a potential virus or other unwelcome data-risk.

Changing the multimedia encoders or decoders on the mobile device after manufacturer can be complex and difficult to do. The mobile device manufacturer expects the user to be satisfied with the multimedia encoders or decoders provided with the mobile device and generally does not encourage changing or adding to them. Even if additional encoders or decoders are available, many users may not wish to install them if they are not supported by the manufacturer or the installation process has many complicated steps and risks damaging firmware or other portions mobile device.

SUMMARY

In various embodiments, a method, system, apparatus, and computer program product are provided for exchanging multimedia data between one or more different mobile devices. Many times the multimedia data on one mobile device cannot be processed on another mobile device due to different formatting requirements, codes, decoders, or other drivers between the two or more devices. Accordingly, a transmitting mobile device may identify that certain multimedia data formatted in the primary format. To accommodate this dilemma, the transmitting mobile device uploads the multimedia data formatted in accordance with the primary format to a multimedia communication server and in return receives a multimedia identifier. The multimedia data is associated with the multimedia data uploaded to the multimedia communication server and can be used to track the location of the multimedia data both on the transmitting mobile device and many other receiving mobile devices. Instead of sending the actual multimedia data, the transmitting mobile device only has to forward the multimedia identifier to any receiving mobile device. Depending on compatibility requirements, the receiving mobile device uses the multimedia identifier to request transcoding the multimedia data into a secondary format on the multimedia communication server that the receiving mobile device can receive and process.

In further embodiments of the present invention, the multimedia communication server receives a request to upload multimedia data formatted in accordance with a primary format on the multimedia communication server and make it available for access by one or more receiving mobile devices. Access is provided to these receiving mobile devices even though it is possible that some, if not all, will be unable to process the multimedia data in the primary format as it is stored and will need to have the multimedia data transcoded, typically on demand, into a secondary format depending on the compatibility requirements of the receiving mobile device. Rather then sending to any receiving mobile devices, the multimedia communication server obtains the multimedia data and stores it ready to be transcoded from the primary format into one of more secondary formats as required by the compatibility requirements of each receiving mobile device. The multimedia communication generates and transmits, usually in return to the transmitting mobile device, a multimedia identifier associated with the multimedia data stored in the primary format and to be used by the receiving mobile devices to reference the location of the multimedia data on the server. When the multimedia communication server later receives the multimedia identifier, the server transcodes the multimedia data formatted in the primary format into a secondary format that the receiving mobile device providing the multimedia identifier is capable of receiving and processing.

Embodiments of the present invention also include receiving a multimedia identifier associated with the multimedia data stored on a multimedia communication server in a primary format that cannot be processed by the receiving mobile device. Upon receiving the multimedia identifier, the receiving mobile device may respond by transmitting a download confirmation indicating a secondary format for the multimedia data that the receiving mobile device can process. In some cases, the compatible secondary format is specified explicitly in the download confirmation sent back to the server while in other situations, the secondary format for the receiving mobile device is contained in a profile for the receiving mobile device that the server can query and access compatibility information. Once the secondary format of the data is made available on the multimedia communication server, the receiving mobile device receives the multimedia data transcoded from the primary format that the receiving mobile device cannot process into the secondary format that the receiving mobile device can process.

Aspects of the present invention provide a method and system of registering a phone device on a synthetic communication network. One implementation receives a request to connect the phone device to a synthetic communication network that transmits messages over a data network using one or more phone numbers from a voice network. Aspects of the present invention initially obtain a phone number and a corresponding country code presumed associated with the phone device to be used for communications over the synthetic communication network. Based on the country code, the phone number is normalized to a standard format that distinguishes the resulting normalized phone number from international phone numbers using the synthetic communication network. Before the phone device is registered, aspects of the present invention verify an association between the normalized phone number and the phone device by sending a verification message addressed to the phone device that loops back and returns to the phone device. If the phone device confirms the verification as authentic then an authorization from the synthetic communication network allows the phone device to communicate over the synthetic communication network.

Yet another aspect of the present invention concerns normalizing a phone number to be used on a data network with phone numbers from one or more different countries. In one implementation, the normalization operation receives a default country code and phone number to be transformed into a normalized phone number. Aspects of the present invention will add an international dialing prefix to the phone number when the default country code is included in the phone number. Alternatively, aspects of the present invention may add both an international dialing prefix and a country code to the phone number when the phone number does not include the international dialing prefix and the default country code.

Another aspect of the present invention concerns synchronizing phone number entries from a phone directory for a voice network with a directory for members of a synthetic communication network. One implementation receives a request to determine if a phone number used for a voice network can also receive communications over a synthetic communication network that transmits messages over a data network. To make the determination, the implementation obtains a normalized version of the phone number from the entry in the phone directory that includes a country code and formatted consistent with phone numbers registered on the synthetic communication network. A comparison then determines if a normalized phone number from an entry in the phone directory matches a normalized phone number registered with the synthetic communication network. When a match is found, aspects of the present invention indicate that the phone number from the entry in the phone directory is registered on the synthetic communication network and can be used to transmit messages over the synthetic communication network.

BRIEF DESCRIPTION OF THE DRAWINGS

Like numbers and designations in the various drawings indicate like elements.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure.

Implementing one or more embodiments of the present invention, at least one or more of the following advantages may be obtained. Multimedia data can be transmitted between devices despite each device having potentially different multimedia formatting requirements. To send a video or other multimedia data, a transmitting mobile device sends the multimedia data in a format convenient to the transmitting mobile device. The format of the multimedia data transmitted may or may not be compatible with the receiving mobile device. In the event the multimedia format is not compatible with the receiving mobile device, implementations of the present invention transcode the multimedia data into a suitable multimedia format the receiving device can readily process.

Advantageously, the transmitting mobile device sends multimedia data in a single data format regardless whether the receiving mobile devices may use it immediately or only after it is transcoded into a preferred secondary or alternate format. This allows the transmitting mobile device to send multimedia data a primary format to multiple receiving mobile devices without concern how or when the multimedia data may be transcoded into one or multiple different secondary formats. This also allows compatibility with future multimedia formats as implementations of the present invention not only identify a primary format of the multimedia data being transmitted but also determine and transcode into the secondary format of the data the receiving mobile device is capable of processing.

Figure 1:
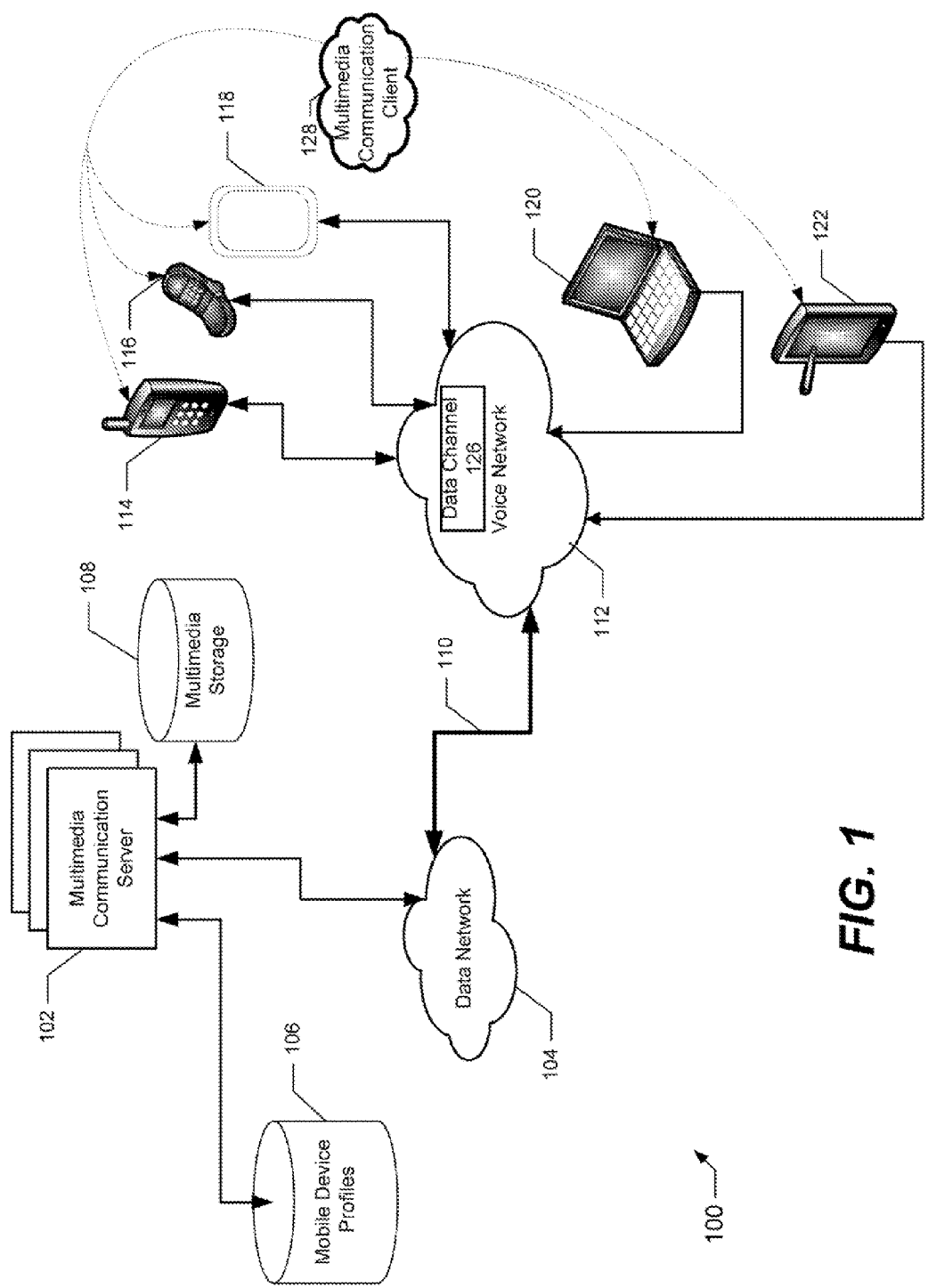
FIG. 1 is block diagram illustrating a communication system for carrying multimedia data in accordance with implementations of the present invention.

FIG. 1 is a block diagram illustrating a communication system 100 for carrying multimedia data in accordance with aspects of the present invention. In one implementation, communication system 100 includes a multimedia communication server 102 that exchanges multimedia data through a data network 104 and a voice network 112 over a communication bridge 110. Multimedia communication server 102 further has access to mobile device profiles 106 and multimedia storage 108 for storing multimedia data in one or more different formats.

Mobile device profiles 106 may include specifications and capabilities for different models of mobile devices supported by communication system 100. For example, the specification for a mobile device may include default display resolution, display size, communication bandwidth, a mobile identifier such as a phone number, internal memory and storage capacity, multimedia data processing capabilities, default language, locale and other settings associated with particular model of the mobile device.

Mobile devices registered with multimedia communication server 102 may further specify preferences and customizations in mobile device profiles 106. Each registered mobile device may specify certain preferences in the mobile device profiles 106 to be used with the mobile device. For example, a mobile device may be able to process multiple different multimedia formats however the user may prefer to see all videos in MPEG-4 or another preferred multimedia format. Customizations in mobile device profiles 106 also tracks variations in both hardware and software for different releases or manufacturing runs of a mobile device. In some implementations, hardware variations in a later manufactured model of a mobile phone device may include a screen with a different resolution or display aspect ratio.

Multimedia storage 108 includes storage devices, databases and systems for storing multimedia data in one or more different formats. In one implementation, multimedia storage 108 stores multimedia data in a primary format associated with a transmitting mobile device. The transmitting mobile device sends the multimedia data in the primary format in the event the receiving mobile device is capable of processing the multimedia data in same format. For example, the transmitting mobile device and receiving mobile device may both use the multimedia video format of MPEG-4 for recording, storing and sending videos.

If the receiving mobile device uses a secondary format, aspects of the present invention then transcodes the multimedia data from the primary format into the secondary format as appropriate for the particular receiving mobile device. For example, multimedia communication server may transcode multimedia data in a primary format from a transmitting mobile device to a secondary format that a receiving mobile device can process. Transcoding involves a digital-to-digital conversion of data encoded in one format into another encoded digital format. In some implementations, transcoding is usually done in two steps: first, the multimedia data in the primary format is decoded and converted to an intermediary format. Next, the multimedia data in the intermediary format is encoded and converted to the target or secondary format.

Once transcoded, the multimedia data in the secondary format is stored on multimedia storage 108 for the receiving mobile device as well as other mobile devices that might need the same secondary format. Accordingly, multimedia storage 108 is not limited to storing the multimedia data in one primary format or one secondary format but may include multiple different formats of the multimedia data as needed by the transmitting and receiving mobile devices.

In the example communication system 100 in FIG. 1, multimedia communication server 102 exchanges the multimedia data over data network 104 to one or more mobile devices associated with voice network 112. In one implementation, data network 104 may include a combination of one or more networks including the Internet or an intranet within a business or company. Communication bridge 110 facilitates connecting mobile devices on voice network 112 to data network 104 and then to the Internet or intranet.

A wireless carrier providing voice network 112 facilitates the exchange of voice communication among mobile devices in addition to the exchange of multimedia data in accordance with the present invention. Each mobile device on voice network 112 is provisioned—typically by the wireless carrier with a phone number that operates as a mobile identifier. Implementations of the present invention use these mobile identifiers to help coordinate the exchange of multimedia data between mobile devices and may use one or more different wireless protocols in voice network 112. Wireless carriers implementing wireless protocols in voice network 112 may include Global System for Mobile (GSM), Code Division Multiple Access (CDMA) as well as many other derivatives and variants of these protocols.

In the exemplary voice network 112 in FIG. 1, mobile devices may include a smartphone 114, a conventional mobile phone 116 (also referred to s a "feature phone"), a tablet computer 118, a netbook 120 and a smartbook 122. Each of the mobile devices on voice network 112 have a wireless connection to voice network 112 data network 104 and the Internet directly or over bridge 110. As previously described, each mobile device is provisioned with a mobile identifier—such as a phone number—that identifies each device and allows for the exchange of multimedia data as well as voice communication between the mobile devices.

Generally, it is presumed that mobile devices used on voice network 112 may have different hardware capabilities and software requirements depending on the different target markets. For example, smartphone 114, such as the iPhone® (iPhone is a trademark of Apple. Inc.), provides voice communication and generally include one or more cores or processors for executing applications or "apps" that display images and videos on a relatively large high resolution screen. Conventional mobile phone 116 display images and videos using a lower resolution display, a less powerful processor, less memory and lower in cost. In comparison, a tablet computer 118 like the iPad® (iPad is a trademark of Apple. Inc.) generally has a large touch screen display used to manipulate data on the tablet computer for gaming and reading. Netbook 120 has features of a general purpose laptop computer with built-in wireless modems for connecting to voice network 112 or other local area networks using Wi-Fi. Smartbooks 122 have features of a mobile phone device with lower power consuming processors and electronics but may also perform some general computing functions. Further, mobile devices may be a mobile music and multimedia player device like an iPod® (iPod is a trademark of Apple. Inc. of Cupertino, Calif.) or Zune® (Zune is a trademark of Microsoft, of Redmond Wash.) provided the devices have some wireless connectivity options. Indeed, voice network 112 and data network 104 may support a variety of other mobile devices and thus the aforementioned mobile devices are not meant to be limiting in any way but illustrative of the wide range of mobile devices to benefit from implementations of the present invention. Accordingly, references to a mobile device or mobile devices includes the aforementioned mobile devices as w as any other mobile device provisioned with a mobile identifier such as a phone number and capable of implementing aspects of the present invention.

To exchange multimedia data, voice network 112 incorporates messaging services through a data channel 126 portion of voice network 112. Mobile devices registered on the voice network 112 use multimedia communication client 128 to manage the messaging and the exchange of multimedia data in accordance with the present invention. Multimedia client 128 executes on one or more of the mobile devices and interacts with multimedia communication server 102 of the present invention. In one implementation, multimedia communication client 128 uses conventional messaging protocols such as SMS (short messaging service) and multimedia messaging service (MMS). SMS messages are used to communicate approximately 128 to 160 characters between multimedia communication clients 128 and multimedia communication server 102. Larger amounts of data including multimedia data may be transmitted using the MMS protocol. The MMS protocol is an improvement over the limitations of the SMS text protocol as it allows mobile devices to exchange larger amounts of multimedia content over data channel 126 and voice network 112.

Instead of SMS or MMS messaging, an alternate implementation of multimedia communication client 128 may use messaging services provided through a synthetic communication network described in pending U.S. Application Ser. No. 12/732,182 assigned to the assignee of the present invention and filed Mar. 25, 2010 entitled "Synthetic Communication Network Method and System" incorporated by reference herein for all purposes. The synthetic communication network bypasses data channel 126 and creates a messaging service directly over data network 104. For example, the synthetic communication network may use XMPP or SIMPLE messaging protocols for messages. In accordance with some implementations, synthetic communication network may also send larger text and multimedia messages as the messages avoid data channel 126 and therefore not constrained by a fixed character limit.

Mobile devices accessing data network 104 and messaging services provided by the synthetic communication network rely upon the data plan services offered through a service provider of voice network 112. The mobile identifier used to identify each mobile device on the synthetic communication network is essentially the same as the phone number provisioned on voice network 112. Some implementations access data network 104 and the Internet using data incorporating technologies such as Enhanced Data Rates from GSM Evolution (EDGE), Universal Mobile Telephone Standard (UMTS), High Speed Downlink Packet Access (HSDPA) and Evolution Data Optimized (EVDO). Alternatively, mobile devices may also access directly access data network 104 and the Internet using other wireless technologies such as WiMax, WiFi 802.11a/b/c/n/x or other similar protocols.

Figure 2:
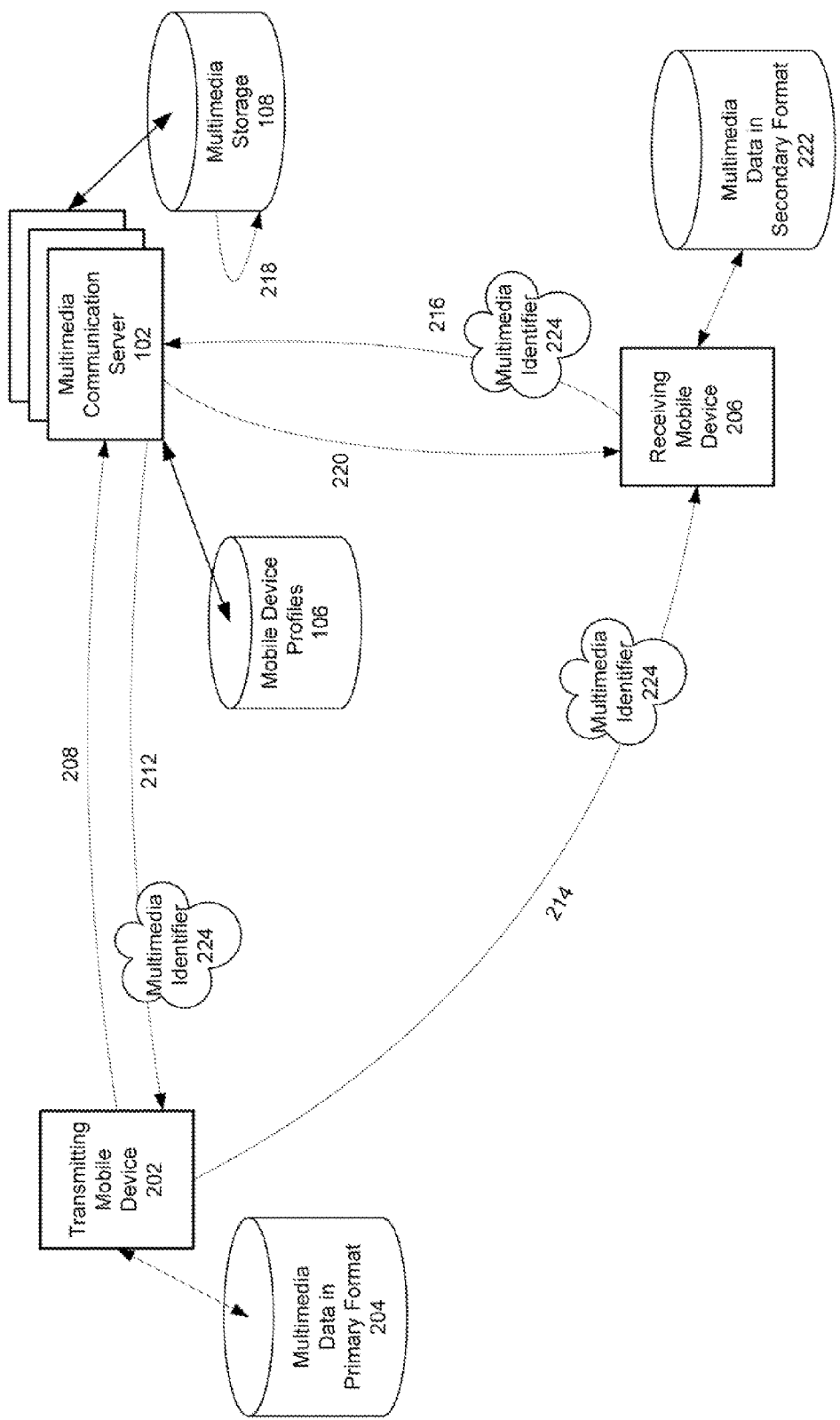
FIG. 2 is a schematic diagram illustrating the overall operations associated with processing multimedia data in accordance with implementations of the present invention.

FIG. 2 is a schematic diagram illustrating the overall operations associated with processing multimedia data in accordance with one implementation. This example schematic diagram includes a transmitting mobile device 202, multimedia data in a primary multimedia format 204, a receiving mobile device 206, multimedia data in a secondary format 222, a multimedia communication server 102, mobile device profiles 106, multimedia storage 108, and multimedia identifier 224.

In operation, transmitting mobile device 202 attempts to send multimedia data in primary format 204 to receiving mobile device 206. Instead of sending directly to receiving mobile device 206, multimedia data in primary format 204 is uploaded (208) to multimedia communication server 102 over one or more networks. For example, transmitting mobile device 202 may send multimedia data in primary format 204 over a voice network, a bridge to a data network and then to multimedia communication server 102

Multimedia communication server 102 stores the multimedia data in the primary format 204 on multimedia storage 108. To track the multimedia data, multimedia communication server 102 associates the multimedia data in primary format 204 with multimedia identifier 224. In some implementations, multimedia identifier 224 can be a 128-bit value capable of individually identifying a specific multimedia data stored on multimedia storage 108.

Next, multimedia communication server 102 downloads the multimedia identifier 224 to the transmitting mobile device 202 (212). Transmitting mobile device 202 uses the multimedia identifier 224 to reference multimedia data stored on multimedia storage 108 in primary format 204. Transmitting mobile device 202 may then send a message containing the multimedia identifier 224 (214) to the receiving mobile device 206. For example, the multimedia identifier 224 may be sent using SMS, MMS or a message on the aforementioned synthetic network described in U.S. patent application Ser. No. 12/732,182, entitled "Synthetic Communication Network Method and Systems". The transmitting mobile device 202 addresses the receiving mobile device 206 using a mobile identifier such as a phone number. In one implementation, transmitting mobile device 202 may further forward an HTTP or secure HTTP (i.e., HTTPS) link referencing the location of multimedia communication server 102 on the Internet in addition to multimedia identifier 224. Indeed while FIG. 2 illustrates only one receiving mobile device 206, transmitting mobile device 202 may transmit multimedia identifier 224 and an HTTP or HTTPS link to more than one receiving mobile device using a multicast or similar protocol if the multimedia data is to be distributed to multiple mobile devices.

To obtain the multimedia data, receiving mobile device 206 contacts multimedia communication server 102 and requests the multimedia data referenced by the multimedia identifier 224 (216). For example, receiving mobile device 206 may reference either an HTTP or HTTPS link to first locate multimedia communication server 102 on the Internet and then use multimedia identifier 224 to identify the multimedia data stored on, or associated with, the communication server 102.

Multimedia communication server 102 transcodes the multimedia data in the primary format 204 into a secondary format (218) as appropriate for each receiving mobile device 206. In one implementation, multimedia communication server 102 may reference mobile device profiles 106 to identify the secondary format used by the receiving mobile device 206. Once transcoded, receiving mobile device 206 receives the multimedia data in secondary format 222 (220) as illustrated in FIG. 2.

Figure 3:
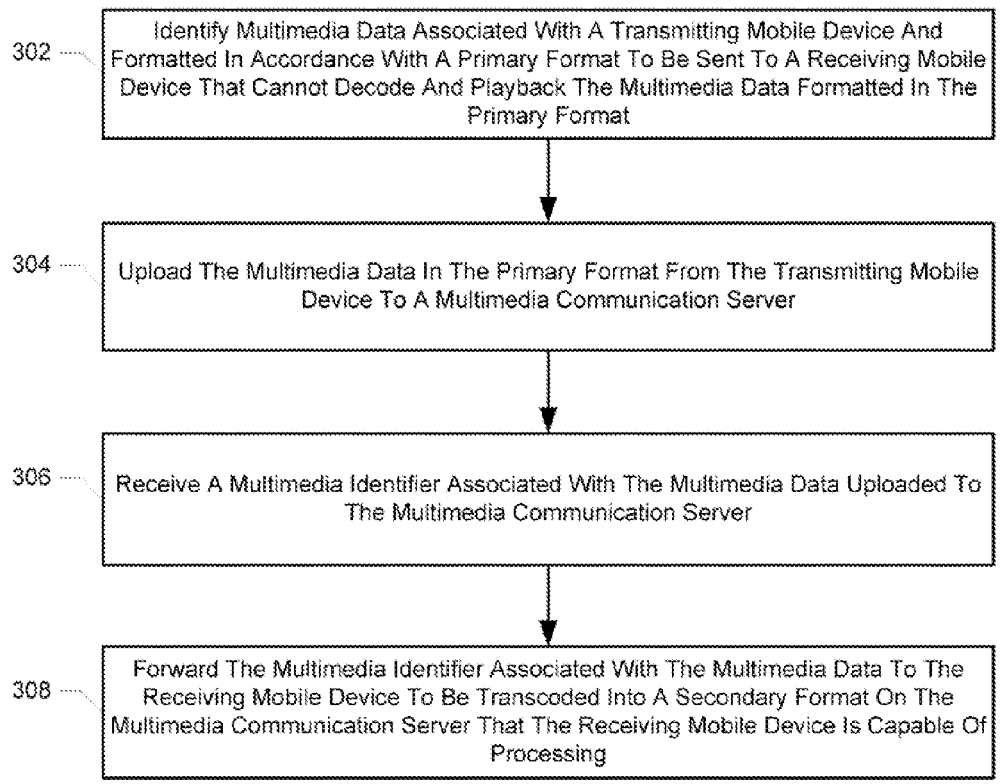
FIG. 3 is a flowchart diagram of the operations used by a transmitting mobile device sending media data in a primary format in accordance with implementations of the present invention.

FIG. 3 is a flowchart diagram of the operations used by a transmitting mobile device sending multimedia data formatted in accordance with a primary format. Initially, a transmitting mobile device identifies multimedia data to be transmitted to a receiving mobile device. In one implementation, the transmitting mobile device specifies the receiving mobile device on a voice network using a phone number or other mobile identifier associated with the receiving mobile device. In accordance with one implementation, the receiving mobile device may not be able to decode and playback the multimedia data formatted in the primary format (302). For example, a video taken with a camera on a transmitting mobile device may be formatted in a video format such as MPEG-4 that the receiving mobile device cannot decode or playback as it lacks the proper codec, software, or other drivers.

Instead of sending the multimedia data directly to the receiving mobile device, the transmitting mobile device uploads the multimedia data in the primary format to a multimedia communication server (304). For example, the multimedia data in the primary format may be uploaded to the multimedia communication server embedded thin or through an MMS message or other message type over the synthetic communication network as previously described. The multimedia communication server stores the multimedia data in the primary format and also generates a multimedia identifier for referencing the multimedia data in the primary format. Both the transmitting mobile device and the receiving mobile may use the multimedia identifier to reference the multimedia data in the primary format as it is stored on the multimedia communication server.

Accordingly, the transmitting mobile device then receives the multimedia identifier associated with the multimedia data in the primary format (306). In some implementations, the multimedia communication server sends the multimedia identifier to the transmitting mobile device using a messaging protocol and message, for example, such as an SMS text message, an MMS message, or as other type of message using the aforementioned synthetic network. Additional descriptive information and a thumbnail image associated with the multimedia data may also be provided with this message to the transmitting mobile device, this can be used to confirm indirectly that the multimedia communication server as successfully received and processed the multimedia data. For example, a still image taken from a video and a title or caption associated with the video contents may also be provided from the multimedia communication server to the transmitting mobile device.

Next, the transmitting mobile device forwards the multimedia identifier associated with the multimedia data to the receiving mobile device. The multimedia identifier facilitates transcoding the multimedia data into secondary format the receiving mobile device can process (308). Since the secondary format used by the receiving mobile device is typically unknown, the multimedia communication server defers performing the transcoding until the multimedia data is requested. In some implementations, the server transcodes the multimedia data from the primary format into the secondary format when the receiving mobile device demands the multimedia data using the multimedia identifier. In this manner, implementations of the present invention offload transcoding of multimedia data from the primary format into the secondary format into the "cloud" by way of the multimedia communication server. When the demand for the multimedia data does not explicitly specify the secondary format, multimedia communication server may determine the appropriate secondary format through a query of a mobile device profile associated with the receiving mobile device.

Figure 4:
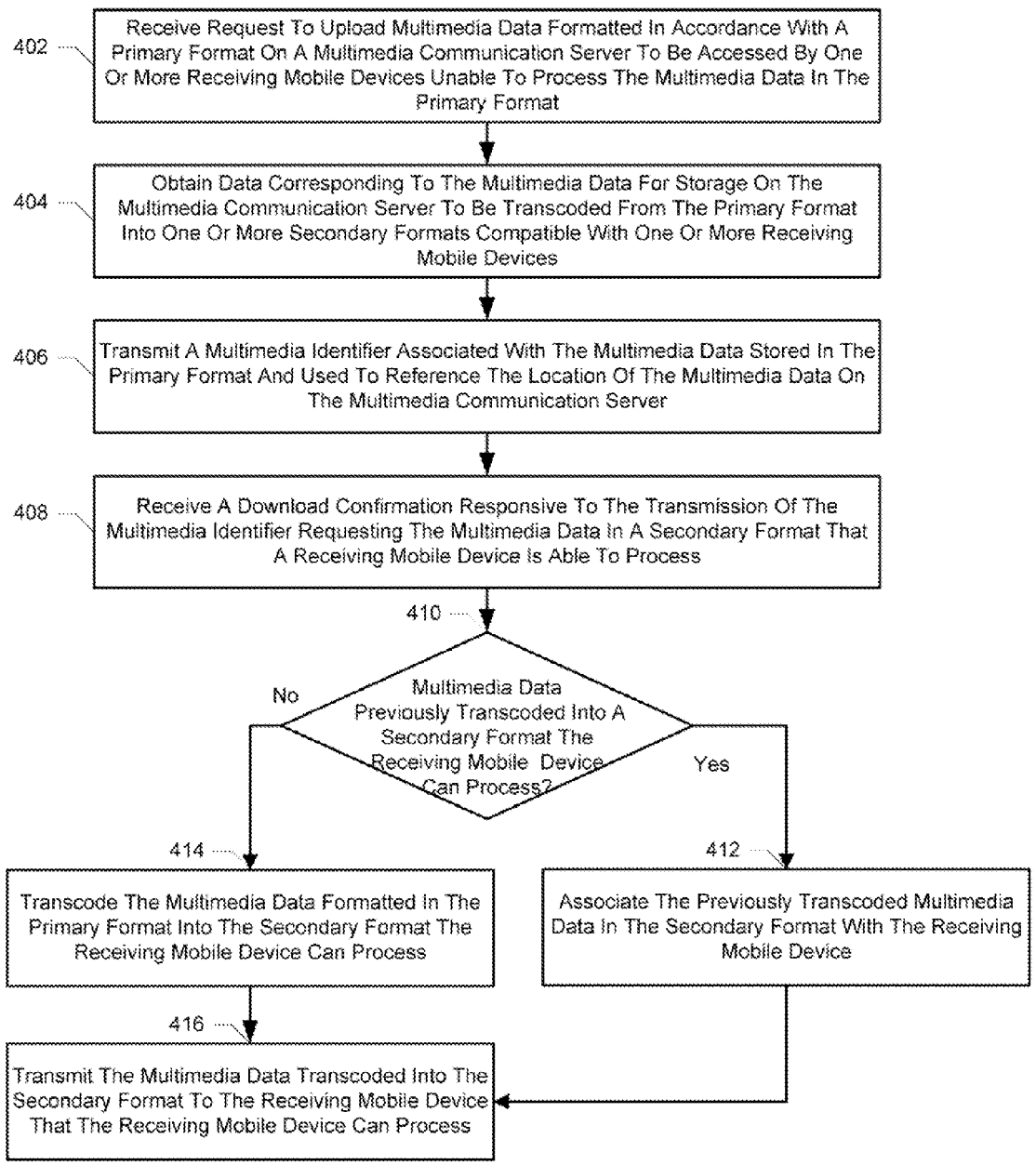
FIG. 4 is flowchart diagram illustrating the operations associated with processing multimedia data on a multimedia communication server in accordance with implementations of the present invention.

Referring to FIG. 4, a flowchart diagram illustrates the operations associated with processing multimedia data on a multimedia communication server in accordance with aspects of the present invention. In this example, implementations of the present invention initially receive a request to upload multimedia data formatted in accordance with a primary format (402). Typically, the multimedia data is in a primary format that the transmitting mobile device can process but the receiving mobile device is unable to process. For example, one or more receiving mobile devices may not have the proper codecs or decoders to decode the multimedia data in the primary multimedia format, such as a video formatted in MPEG-4 or other video format.

Next, the multimedia communication server obtains data corresponding to the multimedia data in a primary format for storage on the multimedia communication server (404). For example, the multimedia communication server may obtain the data for the multimedia data from the transmitting mobile from an MMS message, a streaming protocol, a file transfer protocol, a message over the aforementioned synthetic communication network or other data transfer methods. The multimedia communication server stores the multimedia data in the primary format and prepares for transcoding the multimedia data into a one or more secondary formats on demand as the requests from one or more receiving mobile devices are made.

In one implementation, multimedia communication server may also receive metadata with further details on the transmitting mobile device, receiving mobile devices, and the multimedia data. Metadata associated with the transmitting and receiving mobile devices may include a phone number or other mobile identifier, a display resolution, a display size, a make and model of the mobile device, and a multimedia format each of the mobile devices are capable of processing. In some implementations, metadata describing the mobile devices and multimedia data may be included in the multimedia data and sent directly to the multimedia storage server. Alternatively, some metadata may be stored in a database such as mobile device profiles 106 in FIG. 1 and referenced using a phone number or other mobile identifier associated with either a transmitting or receiving mobile device.

Next, implementations of the present invention transmit a multimedia identifier associated with the multimedia data stored in the primary format on the multimedia communication server (406). This multimedia identifier is used by one ore receiving mobile devices to identify and request the multimedia content in the proper format with a value that references a storage location on the multimedia communication server. In some implementations, the value used for the multimedia identifier may be randomly generated and cross-referenced with a storage location in a look-up table on the multimedia communication server. Alternatively, the multimedia identifier value may be combination of values that reference a specific storage device, a filesystem, and file in the filesystem associated with the multimedia communication server. If multiple clusters of storage devices are used, the multimedia identifier value may also be constructed using a reference to the particular storage device cluster where the storage device is located.

Multimedia communication server may delay the process of transcoding between a primary format and a secondary format of the multimedia data until a receiving mobile device makes a request. Accordingly, multimedia communication server receives a download confirmation when a receiving mobile device makes a request for the multimedia data in a secondary format (408). For example, the download confirmation may be sent by a receiving mobile device in response to the transmission of the multimedia identifier. The download confirmation requests the multimedia data in a secondary format that the receiving mobile device is able to process. To facilitate the request, the download confirmation may include a phone number or other mobile identifier used to access a mobile device profile of the receiving mobile device. Using this phone number, the multimedia communication server may access the corresponding mobile device profile and determine the multimedia data format preferred by the receiving mobile device. In turn, multimedia communication servers may also notify the transmitting mobile device that the multimedia identifier as been successfully received by the receiving mobile device and the transcoding process has been initiated in the background.

Aspects of the present invention may then determine if the multimedia data had been previously transcoded into the secondary format used by the receiving mobile device (410). In some cases, the multimedia communication server has already transcoded the multimedia data for another receiving mobile device and the transcoded multimedia data can be reused. For example, a transmitting mobile device may send multimedia data to two or more receiving mobile devices that use the same secondary format for the multimedia data. In this case, the multimedia communication server transcodes and stores the multimedia data into the secondary format upon demand by the first receiving mobile device which is then reused by the second receiving mobile device Accordingly, if the multi media data is in the secondary format (410—Yes) then aspects of the present invention associate the previously transcoded multimedia data in the secondary format with at least one receiving mobile device (412). In one implementation, the multimedia communication server updates a database that cross references a phone number or other mobile identifier of the receiving mobile device with the storage location of the multimedia data in the secondary format.

Next, the multimedia communication server sends the receiving mobile device the multimedia data transcoded into the secondary format that receiving mobile device can process (416). For example, the multimedia communication server may send the multimedia data to the receiving mobile device as part of an MMS message or another type of message using the aforementioned synthetic communication network.

Alternatively, when the multimedia data is not available in the secondary format (410—No) aspects of the present invention transcode the multimedia data formatted in the primary form at into the secondary format the receiving mobile device can process (414). In one implementation, the multimedia communication server is configured with multimedia software and/or hardware to transcode the multimedia data between the primary format and the secondary format. Once the multimedia data has been transcoded, implementations of the present invention send the transcoded multimedia data in the secondary format to the receiving mobile device that can be readily processed (416). For example, the receiving mobile device may decode and playback a video in the secondary format displaying the images and broadcasting the corresponding sound.

Figure 5:
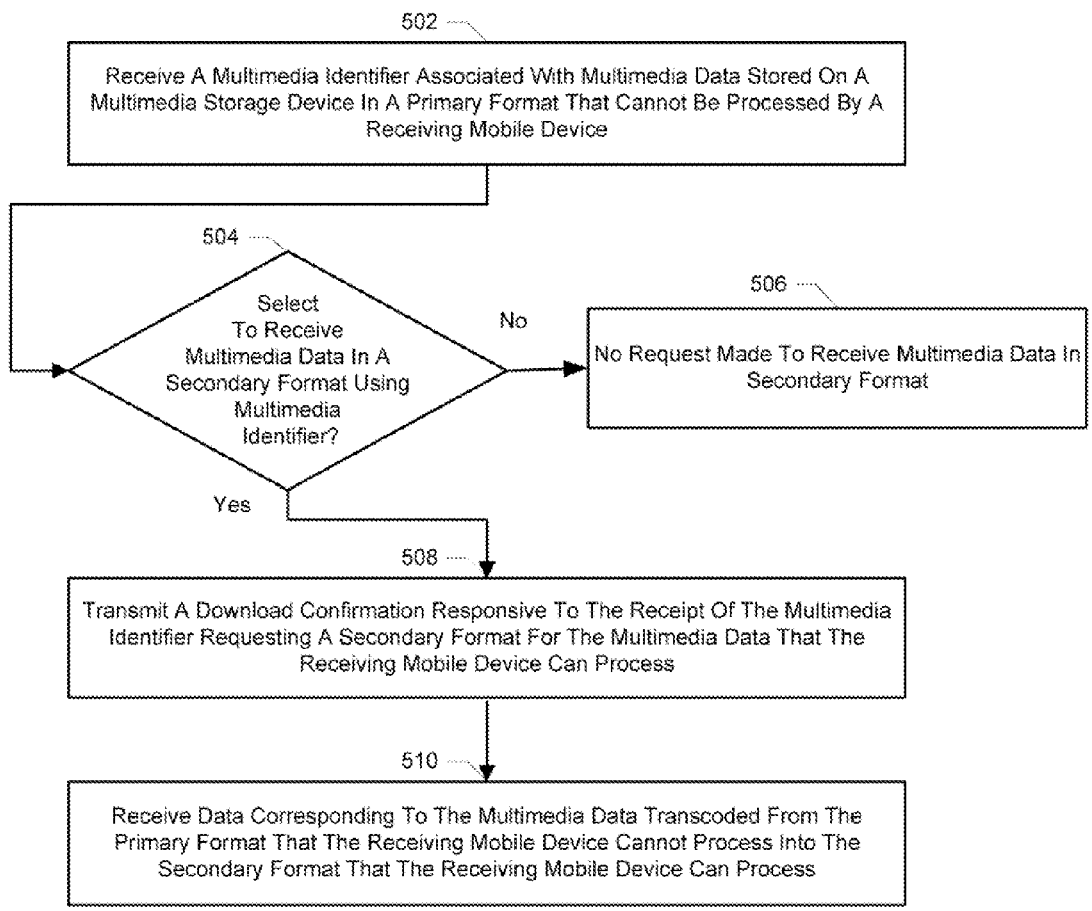
FIG. 5 is a flowchart diagram of the operations that a receiving mobile device uses to process multimedia data in accordance with implementations of the present invention.

FIG. 5 is flowchart diagram of the operations that a receiving mobile device uses to process multimedia data in accordance with the present invention. In one implementation, the receiving mobile device receives a multimedia identifier associated with multimedia data stored on a multimedia communication server (502). For example, the receiving mobile device may receive the multimedia identifier in an SMS text message, an MMS message or a message from the aforementioned synthetic communication network. Often, the multimedia identifies references multimedia data stored in a primary format that the receiving mobile device is not capable of processing. As previously described, the receiving mobile device may lack the proper software and/or hardware with compatible codecs or decoders to process multimedia data such as a video encoded in MPEG-4.

In one implementation, the receiving mobile device uses the multimedia identifier and selects to receive the multimedia data in a secondary format (504—Yes). For example, the receiving mobile device may select an HTTP link and multimedia identifier sent in an SMS text message to the receiving mobile device.

Alternatively, the receiving mobile device may not select to receive the multimedia data (504—No). In some cases, the receiving mobile device may receive a multimedia identifier yet decide not to receive the associated multimedia data if the data is not wanted. If this occurs, implementations of the present invention on the receiving mobile device do not demand or request the multimedia data in the secondary format (506). Consequently, a multimedia communication server would also not transcode the data into the secondary format compatible with the receiving mobile device but instead leave the multimedia data in the primary format or other existing formats.

Alternatively, one implementation transmits a download confirmation to the multimedia storage server and thereby demands transcoding for at least the receiving mobile device. Sending the download confirmation effectively requests that the multimedia communication server download, and transcode as necessary, the multimedia data in the secondary format to the receiving mobile device (508). One implementation of this download confirmation may further include a mobile identifier for the mobile device also used for referencing the mobile device's preferences and settings stored in a database such as mobile device profiles 106 in FIG. 1. This information is useful to the multimedia communication server when transcoding from a primary format of the multimedia data into a secondary format of the multimedia data beneficial to the processing on the receiving mobile device.

Next, the receiving mobile device receives the data corresponding to the multimedia data formatted in the secondary format. In one implementation, the multimedia communication server transcodes the multimedia data from the primary format the receiving mobile device cannot process into the secondary format that the receiving mobile device can process (510). For example, the multimedia communication server may transcode a video originally formatted in a primary format such as MPEG-4 into a secondary format used for video such an AVI format.

Figure 6:
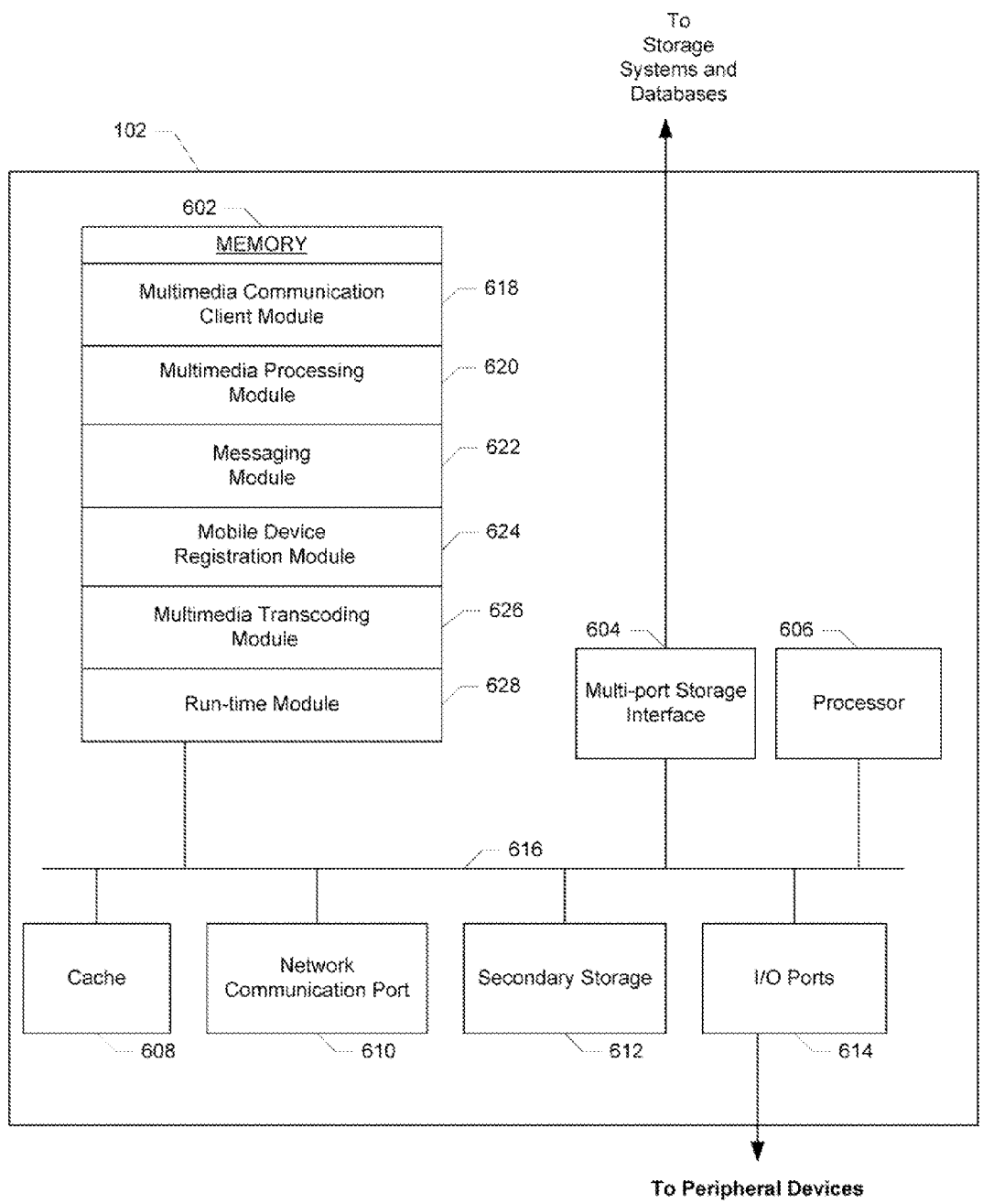
FIG. 6 is a block diagram of a multimedia communication server apparatus used in implementations of the present invention.

FIG. 6 is a block diagram of a multimedia communication server 102 apparatus used in one implementation for performing one or more methods of the present invention. Server 102 may include a memory 602 to hold executing programs (typically random access memory (RAM) or writable read-only memory (ROM) such as a flash ROM), a multiport storage interface 604, a processor 606 for executing instructions, a cache 608 for holding codec, drivers, or other frequently used programs, a network communication port 610 for data communication, a secondary storage 612 with secondary storage controller for backup and high-availability, and input/output (I/O) ports 614 all operatively coupled together over an interconnect 616.

Multimedia communication server 102 may be implemented using a mainframe computer, a cluster of computers, a personal computer or a server appliance. In addition, multimedia communication server 102 can be preprogrammed, for example, using field-programmable gate array (FPGA) technology, ROM or it can be programmed (and reprogrammed) by loading a program from a computer readable medium. For example, executable instructions in memory 602 may also be loaded from a hard drive, a thumb-drive, a DVD, a CD-ROM or other computer readable medium in preparation for execution on processor 606. Also, multimedia communication server 102 can also be implemented using one or more customized application specific integrated circuits (ASICs).

In one implementation, processor 606 executes instructions in memory 602 selected from one or more modules including a multimedia communication client module 618, multimedia processing module 620, messaging module 622, mobile device registration module 624, multimedia transcoding module 626, and run-time module 628 that manages system resources used when processing one or more of the above components on multimedia communication server 102.

Multimedia communication client module 618 facilitates an exchange of multimedia data between a transmitting device and a receiving device in accordance with aspects of the present invention. In one implementation, multimedia communication client module 618 is downloaded from multimedia communication server 102 onto each respective transmitting and receiving mobile device. Alternatively, one or more instances of multimedia communication client module 618 execute on multimedia communication server 102 in a "cloud" and are delivered to both transmitting and receiving mobile devices as software as a service (SaaS).

On the transmitting mobile device, multimedia communication client module 618 sends multimedia data from the transmitting mobile device to a receiving mobile device in accordance with the present invention. Another instance of multimedia communication client 618 associated with the receiving mobile device receives and processes the multimedia data in accordance with the present invention.

In one implementation, multimedia processing module 620 receives and stores multimedia data on the multimedia communication server 102. In addition, multimedia processing module 620 generates a multimedia identifier that references the location of the multimedia data on the multimedia communication server. Multimedia processing module 620 may also store metadata describing the multimedia content, the transmitting mobile device, the receiving mobile device or devices and any other information that help with the delivery and processing of multimedia content in accordance with the present invention.

Messaging module 622 processes messages for communicating with both the transmitting mobile device, the receiving mobile device and other systems used in accordance with the present invention. For example, messaging module may deliver messages using SMS, MMS, SIMPLE, XMPP and other protocols capable of delivering messages with text or multimedia, or both. In one implementation, messaging module 622 sends messages over a synthetic communication network described in U.S. patent application Ser. No. 12/732,182, titled "Synthetic Communication Network Method and System".

Mobile device registration module 624 gathers information on mobile devices and creates corresponding mobile device profiles. Each mobile device profile includes details on the mobile device including a preferred format for multimedia data that the mobile device is capable of processing. Other information may further include the mobile device screen dimensions and resolution, sound reproduction capabilities, available memory on each mobile device, and other information relevant to processing multimedia data on the mobile device. These mobile device profiles may be stored in a mobile device profiles database such as mobile device profiles 106 in FIG. 1.

Multimedia transcoding module 626 converts multimedia data from a primary format into a secondary format in accordance with implementations of the present invention. For example, the primary format and secondary format for video multimedia data may be selected from a set of video formats including: H.261, H.263, H.264, M-PEG, MPEG-1, MPEG-2, MPEG-4 AVI, Ogg, Theora, VC-1 as well as derivatives and combinations these types. In another implementation, the primary format and secondary format for sound multimedia data may be selected from a set of sound formats including: wav, ogg, mpc, flac, TTA, aiff, raw, au, gsm, dct, vox, mmf, mp3, aac, mp4, wma, atrac, ra, rm, ram, dss, msv, dvf, IVS, iklax, mxp4, 3gp, amr, and awb as well as derivatives and combinations these types. In yet another implementation, the primary format and secondary format for image multimedia data may be selected from a set of image formats including: JPEG/JFIF, JPEG 2000, Exif. TIFF, RAW, PNG, GIF, BMP, PPM, PGM, PBM, PNM, WEBP, CGM, SVG, PNS, JPS, and MPO as well as derivatives and combinations these types.

Figure 7:
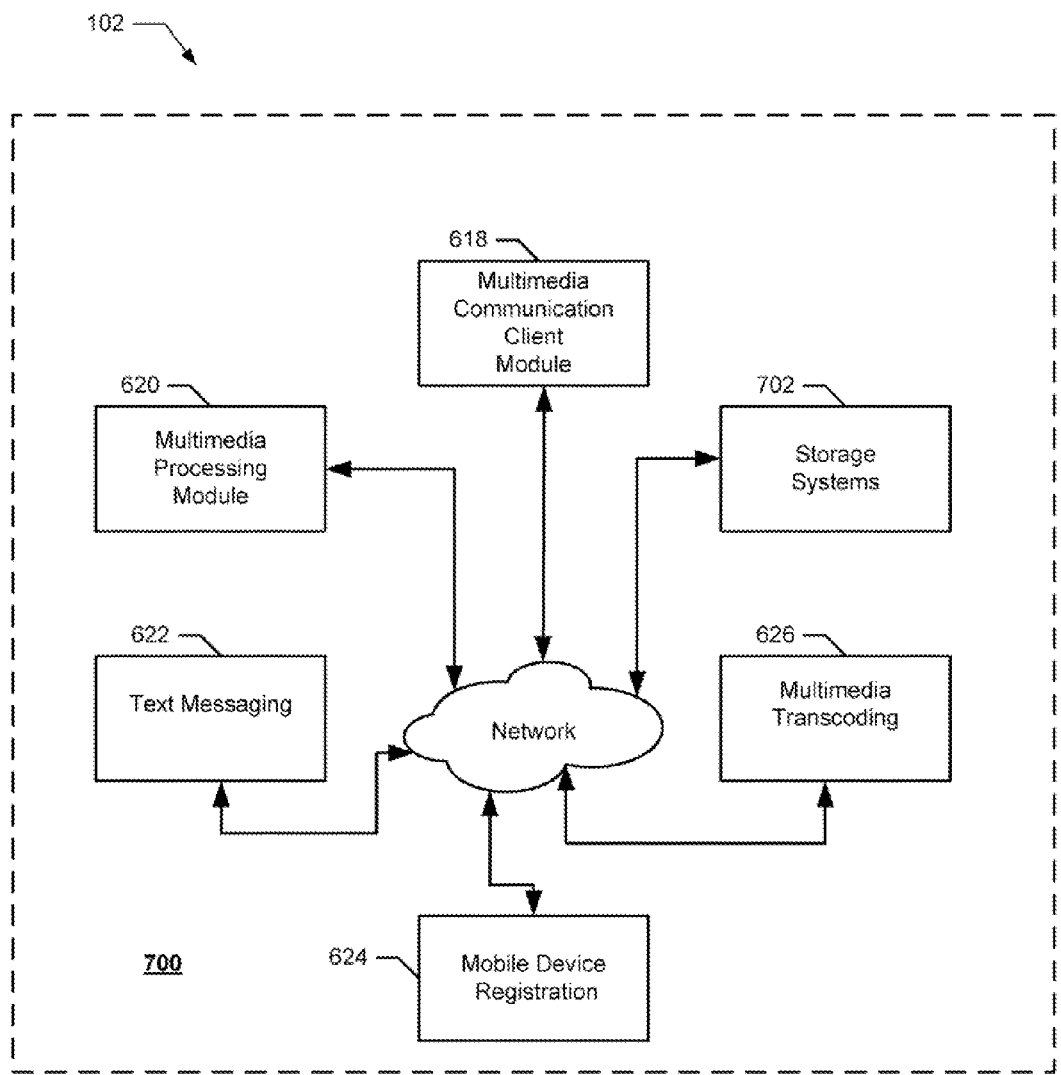
FIG. 7 is a block diagram illustrating a duster of computers implementing multimedia communication functions in accordance with the implementations of the present invention.

An alternate implementation of multimedia communication server 102 may separate the different functions used in implementing aspects of the present invention onto different computers within a cluster 700 of computers as illustrated in FIG. 7. A cluster of computers advantageously improves scalability through better overall utilization of resources and increases reliability as it is less likely for multiple computers to fail simultaneously. For example, separate computer servers in cluster 700 may each be configured to execute Multimedia Communication Client Module 618, Multimedia Processing Module 620, Text Messaging Module 622, Mobile Device Registration Module 622, Multimedia Transcoding Module 624 and Storage Systems 702 for storing multimedia data in one or more formats. Instead of separate computer servers, cluster 700 may be implemented using virtualization technology to create separate virtualized computer servers for each different function in accordance with the present invention. In either implementation, the different computer servers in cluster 700 in FIG. 7 function in a similar manner as the aforementioned corresponding modules described in conjunction with and illustrated in FIG. 6.

Figure 8:
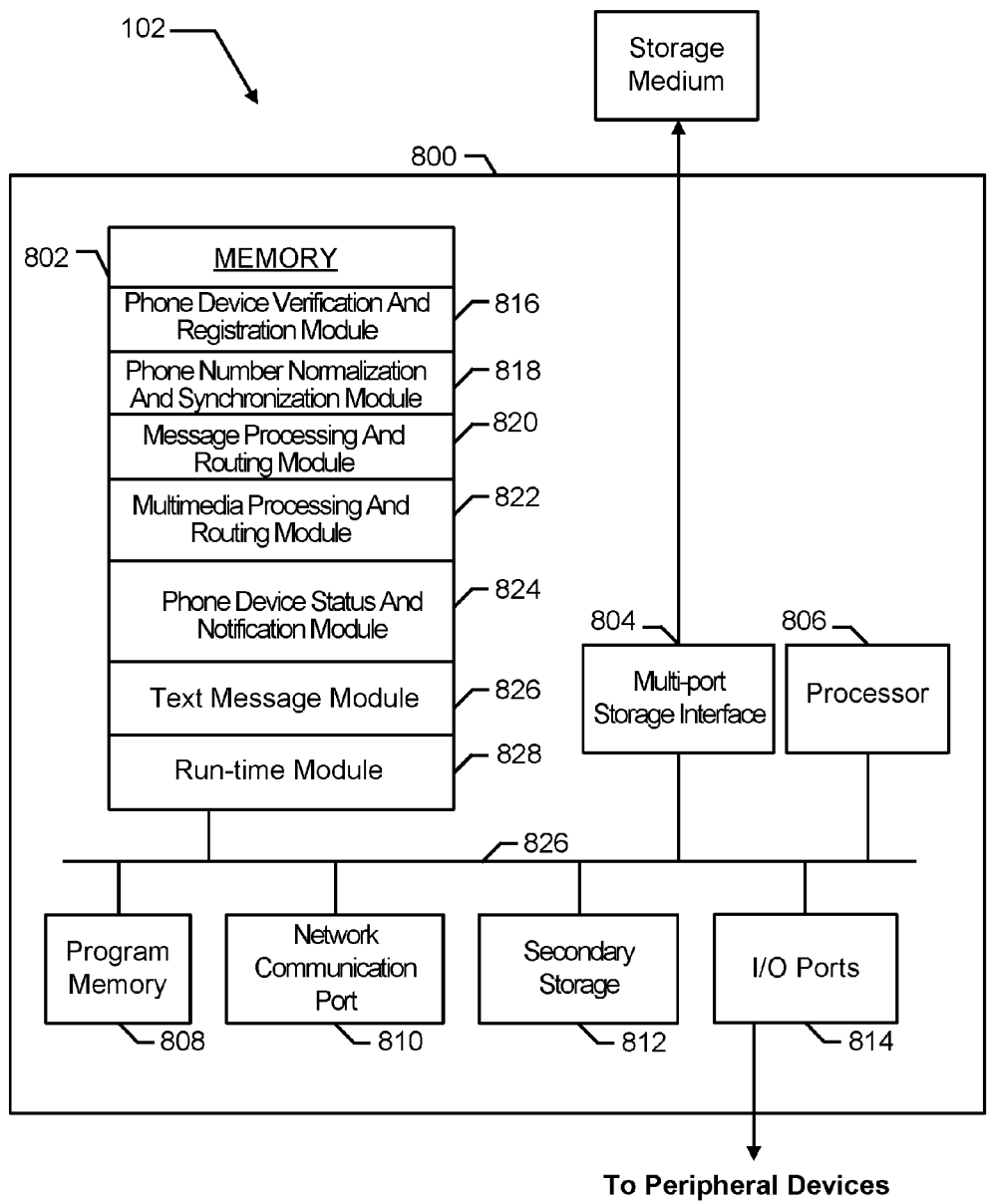
FIG. 8 is a block diagram of a system used in one implementation for performing the apparatus or methods of the present invention in accordance with one implementation of the present invention.

FIG. 8 is a block diagram of a system 800 used in another implementation for performing the apparatus or methods of the present invention. System 800 includes a memory 802 to hold executing programs (typically random access memory (RAM) or writable read-only memory (ROM) such as a flash ROM), a multiport storage interface 804, a processor 806 for executing instructions, a program memory 808 for holding drivers or other frequently used programs, a network communication port 810 for data communication, a secondary storage 812 with secondary storage controller for backup/ high-availability, and input/output (I/O) ports 814 with I/O controller operatively coupled together over an interconnect 826. In addition to implementing the present invention using a conventional personal computer or server, system 800 can be preprogrammed, for example, using field-programmable gate array (FPGA) technology, ROM or it can be programmed (and reprogrammed) by loading a program from another source (for example, from a floppy disk, a CD-ROM or other computer-program product with executable instructions or another computer). Also, system 800 can be implemented using customized application specific integrated circuits (ASICs).

Phone number normalization and synchronization module 818 normalizes the format of different phone numbers in a phone directory on the phone device to a predetermined standard. Implementations of the present invention process each phone number and considers how they should be modified and/or formatted. The normalized phone numbers preferably conform to an international telephone number (ITN) standard and incorporate a country code and other information to identify the ITN on a uniform basis.

The normalized phone numbers are used to synchronize the phone directory of phone numbers with registered phone numbers on the synthetic communication network of the present invention. If a phone number in the directory is also registered on the synthetic communication network then it is added or synchronized with entries in the synthetic communication client running on the phone device. This synchronization continues as new phone numbers are added to the phone directory and normalized phone numbers are added to the synthetic communication network.

Message processing and routing module 820 ensures messages from one phone device pass to another phone device in accordance with aspects of the present invention. The messages on the synthetic communication network use the normalized phone numbers to identify phone devices with particularity. Once identified, the routing module creates a network connection between the phone devices using a protocol such as TCP/IP. This message processing and routing module 820 generally passes text messages between phone devices registered on the synthetic communication network according to their previously verified and normalized phone numbers. In some implementations, messages processed by routing module 820 may operate in a compatibility mode and thus transmit one or more groups of 140 text characters. Alternatively, message processing and routing module 820 may indeed transmit a variable length of characters unlimited by the 140 characters of legacy SMS communication but instead dependent upon the length of the message being transmitted and capacities of the phone device sending or receiving the message.

While examples and implementations have been described, they should not serve to limit any aspect of the present invention. Accordingly, implementations of the invention can be implemented in digital electronic circuitry, or in computer hardware, firmware, software, or in combinations of them. Implementations of the invention may further include a computer program product, comprising a machine usable medium having computer readable program code tangibly embodied therein. The computer readable program code in the computer program product performs implementations of the invention when executed by a programmable processor.

Aspects of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read only memory and/or a random a memory. Generally, a computer will include one or more mass storage devices or storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks; and CD ROM disks. Any of the foregoing can be supplemented by, or incorporated in, ASICs.

While specific embodiments have been described herein for purposes of illustration, various modifications may be made without departing from the spirit and scope of the invention. In some implementations, multimedia data is described as being formatted according to one format or another format yet may also be organized according to a "container" type instead. Containers of data compatible with one container type may be converted from one container type to another container type. In some implementations, the "container" or "container file" may contain a single data type such as audio (e.g., AIFF, WAVE, XMF, or MP3), video, or multiple related data types concerning combinations thereof with audio and video (e.g., 3GP, ASF, AVI, DVR-MS, FLASH video, IFF, QuickTime File Format, MPEG program stream, MP4, and others), while in other implementations the "container file" may further elude subtitles, chapter-information, and meta-data or tags for frames of data or subsets of the data along with synchronization information required to playback the streams of data together. Accordingly, the invention is not limited to the above-described implementations, but instead is defined by the appended claims in light of their full scope of equivalents.

What is claimed is:

1. A method, comprising:
   identifying, on a transmitting mobile device, multimedia data formatted in accordance with a primary format to be sent to a receiving mobile device that cannot process the multimedia data formatted in the primary format;
   uploading the multimedia data formatted in accordance with the primary format to a multimedia communication server;
   responsive to uploading the multimedia data, receiving at the transmitting mobile device from the multimedia communication server a multimedia identifier associated with the multimedia data uploaded to the multimedia communication server; and
   responsive to the receipt of the multimedia identifier received from the multimedia communication server, transmitting over a synthetic communications network the multimedia identifier received from the multimedia communication server from the transmitting mobile device to the receiving mobile device, wherein the receiving mobile device is identified on the synthetic communications network by a normalized version of a phone number in a phone directory, the normalized number originally provisioned for the receiving mobile device on a voice network and subsequently normalized to a standard format used for synchronizing members of and communication over the synthetic communications network, and without the forwarded multimedia identifier passing through the multimedia communication server, the multimedia identifier to be used by the receiving mobile device to request the multimedia data that is to be transcoded into a secondary format on the multimedia communication server that the receiving mobile device is capable of processing.

2. The method of claim 1 wherein the type of multimedia data is selected from a set of multimedia types including images, videos, sound and combinations thereof.

3. The method of claim 1 wherein messages facilitate the transmission of the multimedia data from the transmitting mobile device.

4. The method of claim 3 wherein the messages are sent over a voice network using a messaging protocol selected from a set of protocols including: SMS, MMS, XMPP and SIMPLE.

5. The method of claim 3 wherein the messages are sent over a data network using a messaging protocol selected from a set of protocols including: SMS, MMS, XMPP and SIMPLE.

6. The method of claim 1 wherein the primary format and secondary format are selected from a set of video formats including: H.261, H.263, H.264, M-JPEG, MPEG-1, MPEG-2, MPEG-4, Ogg, Theora, VC-1 as well as derivatives and combinations of these types.

7. The method of claim 1 wherein the primary format and secondary format are associated with an image format selected from a set of image formats including: JPEG/JFIF, JPEG 2000, Exif, TIFF, RAW, PNG, GIF, BMP, PPM, PGM, PBM, PNM, WEBP, CGM, SVG, PNS, JPS, MPO as well as derivatives and combinations of these types.

8. The method of claim 1 wherein the primary format and secondary format are associated with an audio format selected from a set of audio formats including: way, ogg, mpc, flac, TTA, aiff, raw, au, gsm, dct, vox, mmf, mp3, aac, mp4, wma, atrac, ra, rm, ram, dss, msv, dvf, IVS, m4p, iklax, mxp4, 3gp, amr, awb as well as derivatives and combinations of these types.

9. The method of claim 1 wherein the transmitting mobile device and receiving mobile device are selected from a set of mobile devices including: a smartphone, a conventional mobile phone, a tablet computer, a netbook, and a smartbook.

10. A method, comprising:
receiving a request at a multimedia communication server from a transmitting mobile device on a synthetic communications network to upload multimedia data formatted in accordance with a primary format to the multimedia communication server to be made available by the multimedia communication server for access by one or more receiving mobile devices on the synthetic communications network that are unable to process the multimedia data in the primary format;
receiving at the multimedia communication server the multimedia data from the transmitting mobile device for storage on the multimedia communication server to be transcoded from the primary format into one or more secondary formats compatible with the one or more receiving mobile devices;
responsive to receiving the multimedia data at the multimedia communication server, transmitting from the multimedia communication server to the transmitting mobile device a multimedia identifier associated with the multimedia data stored in the primary format, the transmitted multimedia identifier to be used by the one or more receiving mobile devices to reference the location of the multimedia data on the multimedia communication server; and
transcoding the multimedia data formatted in the primary format into a secondary format selected from the one or more secondary formats that a receiving mobile device, selected from the one or more receiving mobile devices, is able to process, wherein the receiving mobile device is identified on the synthetic communications network by a normalized version of a phone number in a phone directory, the normalized number originally provisioned for the receiving mobile device on a voice network and subsequently normalized to a standard format used for synchronizing members of and communication over the synthetic communications network.

11. The method of claim 10 further comprising:
transmitting the multimedia data transcoded into the secondary format to the receiving mobile device.

12. The method of claim 10 further comprising;
receiving a download confirmation responsive to the transmission of the multimedia identifier requesting the multimedia data in a secondary format that the receiving mobile device is able to process.

13. The method of claim 10 wherein transmitting the multimedia identifier further includes sending an image associated with the multimedia data that at least one of the one or more receiving mobile devices is able to process.

14. The method of claim 10 wherein the type of multimedia data is selected from a set of multimedia types including images, videos, sound and combinations thereof.

15. The method of claim 10 wherein the multimedia communication server uses messages during the processing of the multimedia data.

16. The method of claim 15 wherein the messages are sent over a voice network using a messaging protocol selected from a set of protocols including: SMS, MMS, XMPP and SIMPLE.

17. The method of claim 15 wherein the messages are sent over a data network using a messaging protocol selected from a set of protocols including: SMS, MMS, XMPP and SIMPLE.

18. The method of claim 14 wherein the primary format and secondary format are selected from a set of video formats including: H.261, H.263, H.264, M-JPEG, MPEG-1, MPEG-2, MPEG-4, Ogg, Theora, VC-1 as well as derivatives and combinations of these types.

19. The method of claim 14 wherein the primary format and secondary format are associated with an image format selected from a set of image formats including: JPEG/JFIF, JPEG 2000, Exif, TIFF, RAW, PNG, GIF, BMP, PPM, PGM, PBM, PNM, WEBP, CGM, SVG, PNS, JPS, MPO as well as derivatives and combinations of these types.

20. The method of claim 14 wherein the primary format and secondary format are associated with an audio format selected from a set of audio formats including: way, ogg, mpc, flac, TTA, aiff, raw, au, gsm, dct, vox, mmf, mp3, aac, mp4, wma, atrac, ra, rm, ram, dss, msv, dvf, IVS, m4p, iklax, mxp4, 3gp, amr, awb as well as derivatives and combinations of these types.

21. The method of claim 10 wherein the receiving mobile device is selected from a set of devices having a phone number including: a smartphone, a conventional mobile phone, a tablet computer, a netbook, and a smartbook.

22. A method, comprising:
- receiving over a synthetic communications network at a receiving mobile device from a transmitting mobile device, a message containing a multimedia identifier associated with multimedia data stored on a multimedia communication server in a primary format that cannot be processed by the receiving mobile device, wherein the received message has not been relayed through the multimedia communications server and the receiving mobile device is identified on the synthetic communications network by a normalized version of a phone number in a phone directory, the normalized number originally provisioned for the receiving mobile device on a voice network, and subsequently normalized to a standard format used for synchronizing members of and communication over the synthetic communications network;
- transmitting a download confirmation responsive to the receipt of the multimedia identifier indicating a secondary format for the multimedia data that the receiving mobile device can process; and
- receiving data corresponding to the multimedia data transcoded on the multimedia communication server from the primary format that the receiving mobile device cannot process into the secondary format that the receiving mobile device can process.

23. The method of claim 22 wherein the type of multimedia data is selected from a set of multimedia types including images, videos, sound and combinations thereof.

24. The method of claim 22 wherein messages facilitate the receiving of multimedia data on the receiving mobile device.

25. The method of claim 24 wherein the messages are sent over a voice network using a messaging protocol selected from a set of protocols including: SMS, MMS, XMPP and SIMPLE.

26. The method of claim 22 wherein the primary format and secondary format are selected from a set of video formats including: H.261, H.263, H.264, M-JPEG, MPEG-1, MPEG-2, MPEG-4, Ogg, Theora, VC-1 as well as derivatives and combinations of these types.

27. The method of claim 22 wherein the primary format and secondary format are associated with an image format selected from a set of image formats Including: JPEG/JFIF, JPEG 2000, Exif, TIFF, RAW, PNG, GIF, BMP, PPM, PGM, PBM, PNM, WEBP, CGM, SVG, PNS, JPS, MPO as well as derivatives and combinations of these types.

28. The method of claim 22 wherein the primary format and secondary format are associated with an audio format selected from a set of audio formats including: way, ogg, mpc, flac, TTA, aiff, raw, au, gsm, dct, vox, mmf, mp3, aac, mp4, wma, atrac, ra, rm, ram, dss, msv, dvf, IVS, m4p, iklax, mxp4, 3gp, amr, awb as well as derivatives and combinations of these types.

29. The method of claim 22 wherein the receiving mobile device is selected from a set of mobile devices including: a smartphone, a conventional mobile phone, a tablet computer, a netbook, and a smartbook.

30. A transmitting mobile device, comprising:
- a processor that executes instructions; and
- a memory having instructions when executed on the processor, that cause the transmitting mobile device to identify multimedia data formatted in accordance with a primary format that is to be communicated to a receiving mobile device, upload the multimedia data formatted in accordance with the primary format to a multimedia communication server, receive a multimedia identifier associated with the multimedia data uploaded to the multimedia communication server, and transmit over a synthetic communications network the received multimedia identifier associated with the multimedia data stored in the primary format to the receiving mobile device, wherein the receiving mobile device is identified on the synthetic communications network by a normalized version of a phone number in a phone directory, the normalized number originally provisioned for the receiving mobile device on a voice network and subsequently normalized to a standard format used for synchronizing members of and communication over the synthetic communications network, the multimedia identifier to be used by the receiving mobile device to identify the multimedia data for transcoding into a secondary format on the multimedia communication server that the receiving mobile device is capable of processing.

31. A multimedia communication server, comprising:
- a processor that executes instructions; and
- a memory having instructions when executed on the processor that enable the multimedia communication server to receive from a transmitting mobile on a synthetic communications network a request to upload multimedia data formatted in accordance with a primary format on the multimedia communication server and made available for access by one or more receiving mobile devices unable to process the multimedia data in the primary format, obtain data corresponding to the multimedia data for storage on the multimedia communication server to be transcoded from the primary format into one or more secondary formats compatible with the one or more receiving mobile devices, responsive to receipt of the multimedia data, transmit to the transmitting mobile device a multimedia identifier associated with the multimedia data stored in the primary format, receive from the one or more receiving mobile devices the transmitted multimedia identifier to reference the location of the multimedia data on the multimedia communication server and transcode the multimedia data formatted in the primary format into a secondary format selected from the one or more secondary formats that a receiving mobile device, selected from the one or more receiving mobile devices is able to process, wherein the selected receiving mobile device is identified on the synthetic communications network by a normalized version of a phone number in a phone directory, the normalized number originally provisioned for the selected receiving mobile device on a voice network and subsequently normalized to a standard format used for synchronizing members of and communication over the synthetic communications network.

32. A method, comprising:
- receiving, at a multimedia communication server, multimedia data from a transmitting mobile device on a synthetic communications network, the data to be made available for access by one or more receiving mobile devices different from the transmitting mobile device, wherein each of the one or more receiving mobile devices is identified on the synthetic communications network by a normalized version of a phone numbers in a phone directory, the normalized numbers originally provisioned for each of the receiving mobile devices on one or more voice networks and subsequently normalized to a standard format used for synchronizing members of and communication over the synthetic communications network;

storing the received multimedia data on the multimedia communication server;

responsive to receiving, at the multimedia communication server, the multimedia data from a transmitting mobile device, transmitting a multimedia identifier from the multimedia communication server to the transmitting mobile device, the multimedia identifier associated with the storage location of the received multimedia data on the multimedia communication server; and upon receipt of the multimedia identifier from one of the one or more receiving mobile devices, transmitting the received multimedia data to the receiving mobile device.

\* \* \* \* \*